(12) United States Patent
Jo et al.

(10) Patent No.: US 12,113,723 B2
(45) Date of Patent: Oct. 8, 2024

(54) SWITCH FOR TRANSMITTING PACKET, NETWORK ON CHIP HAVING THE SAME, AND OPERATING METHOD THEREOF

(71) Applicant: SAMSUNG ELECTRONICS CO., LTD., Suwon-si (KR)

(72) Inventors: Seongmin Jo, Seoul (KR); Heeseong Lee, Siheung-si (KR); Jaehyun Kim, Incheon (KR); Jinsu Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/311,181

(22) Filed: May 2, 2023

(65) Prior Publication Data
US 2023/0269205 A1 Aug. 24, 2023

Related U.S. Application Data

(62) Division of application No. 17/644,720, filed on Dec. 16, 2021, now Pat. No. 11,652,761.

(30) Foreign Application Priority Data

Jan. 11, 2021 (KR) ........................ 10-2021-0003097

(51) Int. Cl.
*H04L 12/24* (2006.01)
*H04L 49/00* (2022.01)
*H04L 49/109* (2022.01)
*H04L 49/90* (2022.01)

(52) U.S. Cl.
CPC ........ *H04L 49/9094* (2013.01); *H04L 49/109* (2013.01); *H04L 49/3027* (2013.01); *H04L 49/9021* (2013.01)

(58) Field of Classification Search
CPC ......................... H04L 49/109; H04L 49/3027; H04L 49/9021
See application file for complete search history.

(56) References Cited

U.S. PATENT DOCUMENTS

| | | | |
|---|---|---|---|
| 5,521,923 A | 5/1996 | Willmann et al. | |
| 8,019,950 B1* | 9/2011 | Warshofsky | ........ G06F 13/1642 710/310 |
| 8,234,435 B2 | 7/2012 | Yoshida et al. | |
| 8,886,861 B2 | 11/2014 | Kwon et al. | |
| 9,246,831 B2 | 1/2016 | Tokuoka | |
| 9,379,983 B2 | 6/2016 | Yoshida et al. | |

(Continued)

FOREIGN PATENT DOCUMENTS

JP 4215417 B2 * 1/2009 ........... G06F 13/362

OTHER PUBLICATIONS

Notice of Allowance dated Jan. 6, 2023 in corresponding U.S. Appl. No. 17/644,720.

*Primary Examiner* — Elisabeth Benoit Magloire
(74) *Attorney, Agent, or Firm* — F. Chau & Associates, LLC

(57) ABSTRACT

A Network-on-Chip (NoC) includes a packet transmission switch, and a corresponding method of operating the NoC includes storing packets received from an input terminal in a buffer, storing buffer locations in which each of the packets is stored in an ordering queue of an output terminal, and sequentially outputting the packets from the output terminal according to the buffer locations.

20 Claims, 7 Drawing Sheets

(56) References Cited

U.S. PATENT DOCUMENTS

| | | | |
|---|---|---|---|
| 9,652,425 B2 | 5/2017 | Chen et al. | |
| 10,554,584 B2 | 2/2020 | Ge et al. | |
| 2002/0038393 A1* | 3/2002 | Ganapathy | G11C 7/1072 710/22 |
| 2002/0099900 A1 | 7/2002 | Kawarai et al. | |
| 2002/0191626 A1 | 12/2002 | Moriwaki et al. | |
| 2003/0163618 A1 | 8/2003 | Anand et al. | |
| 2003/0179759 A1 | 9/2003 | Wang | |
| 2003/0185213 A1 | 10/2003 | Malomsoky et al. | |
| 2005/0131666 A1* | 6/2005 | Tsai | G06F 30/33 703/17 |
| 2009/0097495 A1 | 4/2009 | Palacharla et al. | |
| 2012/0126850 A1 | 5/2012 | Wasson et al. | |
| 2013/0142066 A1 | 6/2013 | Yamaguchi et al. | |
| 2014/0082239 A1* | 3/2014 | Laughton | G06F 13/36 710/244 |
| 2014/0101339 A1* | 4/2014 | Jandhyam | G06F 13/1673 710/6 |
| 2014/0101340 A1* | 4/2014 | Jandhyam | G06F 13/385 710/6 |
| 2015/0127994 A1* | 5/2015 | Sankar | G06F 11/3636 714/45 |
| 2015/0154093 A1* | 6/2015 | Probyn | G06F 11/221 714/37 |
| 2019/0370068 A1* | 12/2019 | Leyrer | G06F 9/5016 |
| 2020/0067637 A1 | 2/2020 | Wang et al. | |
| 2022/0224658 A1 | 7/2022 | Jo et al. | |

\* cited by examiner

SWITCH FOR TRANSMITTING PACKET, NETWORK ON CHIP HAVING THE SAME, AND OPERATING METHOD THEREOF

CROSS-REFERENCE TO RELATED APPLICATION(S)

This U.S. non-provisional patent application is a divisional of co-pending U.S. patent application Ser. No. 17/644,720, titled SWITCH FOR TRANSMITTING PACKET, NETWORK ON CHIP HAVING THE SAME. AND OPERATING METHOD THEREOF and filed on Dec. 16, 2021, which, in turn, claims priority under 35 U.S.C. § 119 to Korean Patent Application No. 10-2021-0003097 filed on Jan. 11, 2021 in the Korean Intellectual Property Office, the disclosures of which are herein incorporated by reference in their entireties.

FIELD

The present disclosure relates to a switch for transmitting a packet, a network-on-chip (NoC) device having the same, and an operating method thereof.

DISCUSSION OF RELATED ART

Many connection methods use buses, but as chip integration technologies have developed, a greater number of modules may be fit in a same-sized chip. In such cases, bus-based methods may exhibit a bottleneck phenomenon.

As memory bandwidths have increased and a maximum bandwidth of a single memory may approach its peak, system-on-chip (SOC) hardware configurations may be used to support a required bandwidth by configuring a multi-channel memory. Network-on-chip (NoC) devices may connect various functional modules in SOC hardware configurations.

NoC devices introduce the concept of a network into the connection between modules in chips. The operation of NoC devices may be considered analogous to the way that computers are connected to the Internet through a network.

SUMMARY

Embodiments of the present disclosure may provide a switch for transmitting a packet extending a transmission bandwidth, a network on chip (NoC) having the same, and/or an operating method thereof.

According to an embodiment of the present disclosure, a packet transmission switch includes: a first buffer configured to store first packets received from a first input terminal; a second buffer configured to store second packets received from a second input terminal; a first ordering queue configured to store first buffer locations of first internal packets to be provided to a first output terminal from among the first packets; a second ordering queue configured to store second buffer locations of second internal packets to be provided to a second output terminal from among the first packets; a third ordering queue configured to store third buffer locations of third internal packets to be provided to the first output terminal from among the second packets; a fourth ordering queue configured to store fourth buffer locations of fourth internal packets to be provided to the second output terminal from among the second packets; a first buffer allocator configured to allocate the first buffer locations and the second buffer locations for each of the first packets; and a second buffer allocator configured to allocate the third buffer locations and the fourth buffer locations for each of the second packets.

According to an embodiment of the present disclosure, a method of operating a network-on-chip (NoC) includes: storing packets received from an input terminal in a buffer; storing buffer locations where each of the packets is stored in an ordering queue of an output terminal outputting each of the packets, respectively; and sequentially outputting the packets according to the buffer locations from the output terminal.

According to an embodiment of the present disclosure, a network-on-chip (NoC) includes: a first packet transmission switch configured to receive packets from first and second masters; a second packet transmission switch configured to receive packets from third and fourth masters; a third packet transmission switch configured to receive a packet from the first switch and a packet from the second switch and to output the first received packet to a first slave; and a fourth packet transmission switch configured to receive a packet from the first switch and a packet from the second switch and to output the second received packet to a second slave, wherein each of the first to fourth packet transmission switches: receives first packets from an input terminal, determines a buffer location within a buffer and output terminal information for each of the first packets, stores the first packets in the determined buffer locations of the buffer, sequentially stores the buffer locations in an ordering queue of a corresponding output terminal using the determined output terminal information, and sequentially outputs from the output terminal packets stored in the buffer according to the stored buffer locations.

BRIEF DESCRIPTION OF THE DRAWINGS

The above and other embodiments of the present disclosure will be more clearly understood from the following detailed description, taken in conjunction with the accompanying drawings, in which.

DETAILED DESCRIPTION

Hereinafter, embodiments of the present disclosure will be described in detail with reference to the accompanying drawings so that those of ordinary skill in the pertinent art may easily implement these and other embodiments.

A network-on-chip (NoC) and an operating method thereof, according to an embodiment of the present disclosure, may address degradation of bandwidth that might otherwise occur due to head-of-line (HoL) blocking when a multi-channel interleaving memory is connected. The NoC according to an embodiment of the present disclosure may include a common buffer, an ordering queue that stores a location of a buffer storing packets to be sequentially transmitted for each output terminal, and a buffer allocator that determines in which buffer location a packet that enters an input terminal is to be stored. The NoC and the operating method thereof according to an embodiment of the present disclosure may increase overall system performance by increasing a system-on-chip (SoC) backbone bandwidth.

Figure 1:
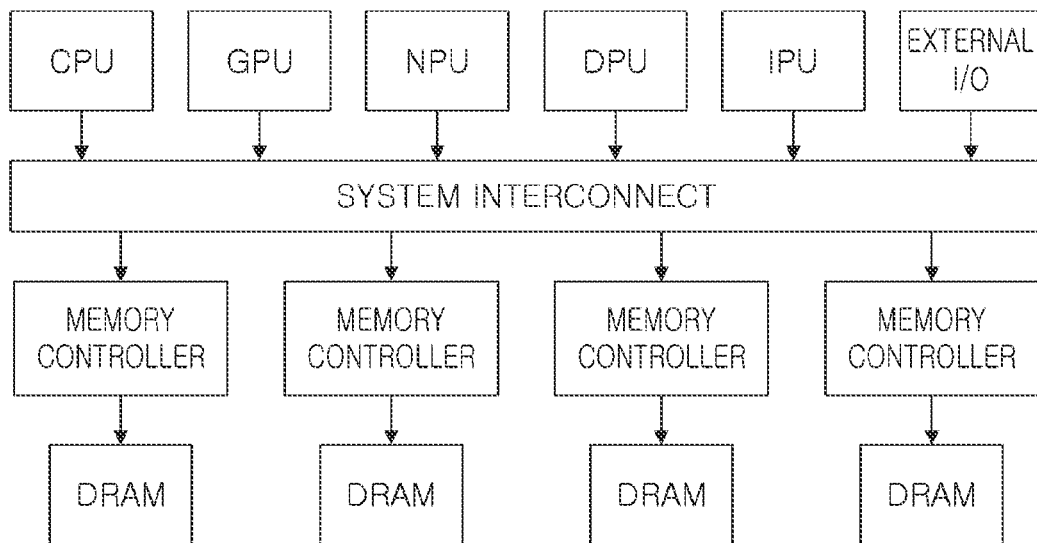
FIG. 1 is a block diagram illustrating a system-on-chip (SoC) hardware configuration.

FIG. 1 illustrates a SoC 10. Referring to FIG. 1, the SoC 10 may include various processing units such as a central processing unit (CPU), a graphical processing unit (GPU), a neural processing unit (NPU), a data processing unit (DPU), and an intelligence processing unit (IPU), a memory device that provides data storage such as a dynamic random-access memory (DRAM), and a memory controller controlling the memory device. The processing units described in this embodiment are masters of external inputs and outputs that support connections with external devices, and the memory controller is a slave. A system interconnect, which may be configured in various forms, may exist between the master and the slave.

The SoC may include a processor controlling an overall system and/or various silicon intellectual property (IP) cores controlled by the processor. The IP cores may be classified as a slave IP core, which is only controlled by the processor, and a master IP core, which may request data communication from a slave IP core by itself. Buses for connection and management of the IP cores in the SoC may include, for example, ARM's Advanced Microcontroller Bus Architecture (AMBA) and SONIC's Open Core Protocol (OCP), without limitation. Bus types of the AMBA may include advanced high-performance bus (AHB), advanced peripheral bus (APB), and Advanced extensible interface (AXI).

An SoC constituting a multi-channel memory may use an interleaving method to simultaneously use a plurality of memory channels. In order for one master to use a plurality of channels at the same time, an interleaving unit may be set to various sizes from 64 B to 4 KB, without limitation thereto. For each SoC, an optimal interleaving unit may be designated and used for a maximum bandwidth.

Figure 2:
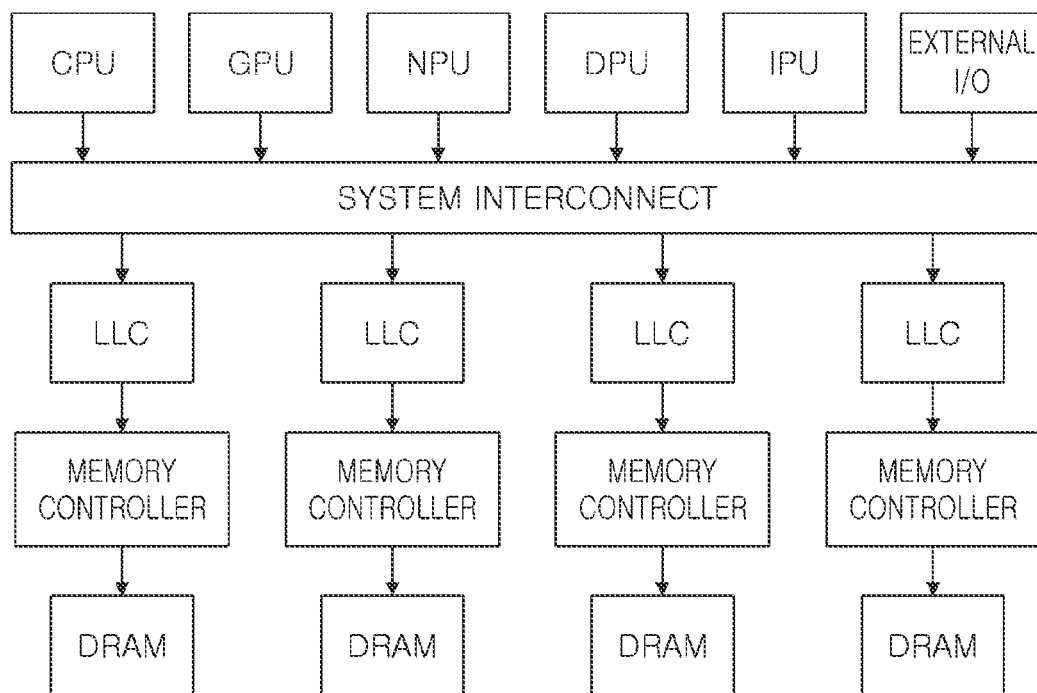
FIG. 2 is a block diagram illustrating an example of a SoC having a last-level cache (LLC) and a system-level cache (SLC).

FIG. 2 illustrates a SoC 20 having a last-level cache (LLC) and a system-level cache (SLC). Referring to FIG. 2, the SoC 20 includes an LLC in each of a plurality of channels. The SOC 20 is similar compared to the SoC 10 shown in FIG. 1, so duplicate description may be omitted.

Each LLC is a device for providing a high bandwidth on chip to avoid reducing a bandwidth required by a DRAM channel. Due to commands such as refresh, activation, precharge, or the like, in addition to commands for reading and writing data, a DRAM accessed by bus or the like might not use a theoretical maximum bandwidth. In contrast, the LLC, configured as a synchronous random-access memory (SRAM), is able to access a single cycle, and thus, the LLC may use the theoretical maximum bandwidth.

In an environment in which the theoretical maximum bandwidth per channel is used through the LLC, a system interconnect may also support a maximum bandwidth required for each master through a structure capable of supporting the maximum bandwidth. However, there are factors that may limit bandwidth in various forms within the system interconnect. Among them, a head-of-line (HoL) phenomenon occurring in a switch may be a significant factor that limits bandwidth.

Figure 3:
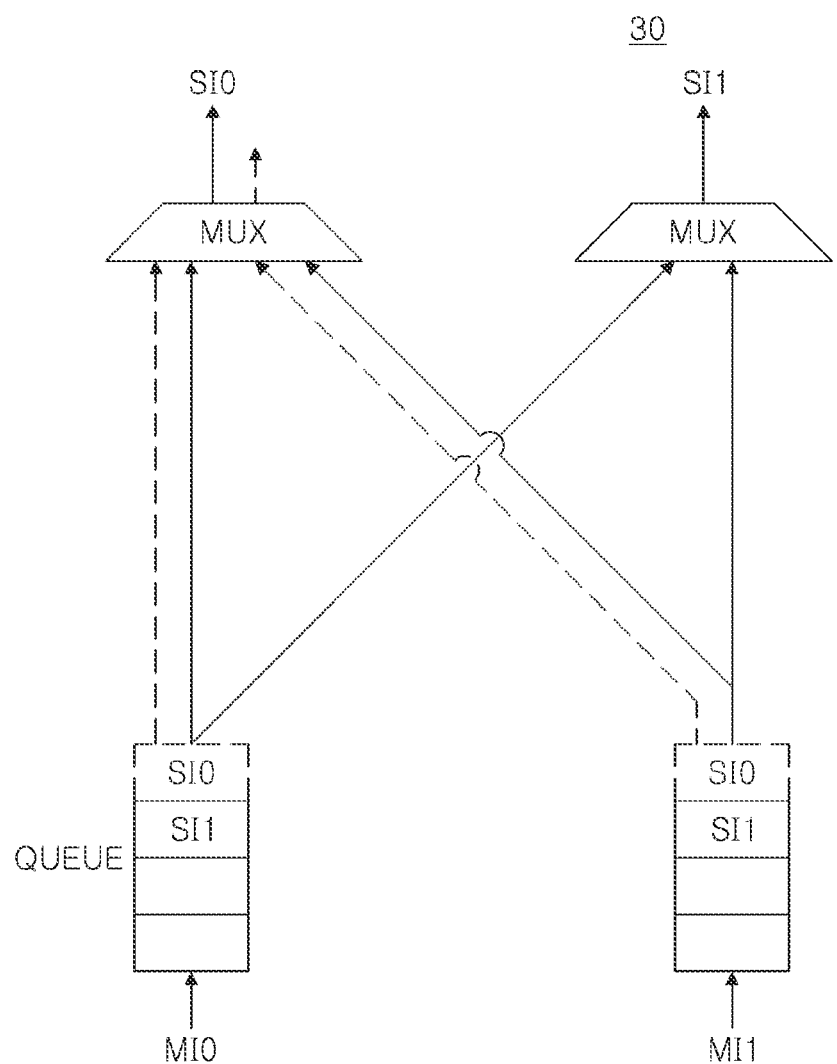
FIG. 3 is a block diagram illustrating a switch 30.

FIG. 3 illustrates a switch 30. Referring to FIG. 3, the switch 30 receives a packet from Master Interface (MI) input terminals MI0 and/or MI1, and outputs the received packet to Slave Interface (SI) output terminals SI0 and/or SI1. Here, the input terminals (MI0/MI1) have a first-in first-out (FIFO) memory that sequentially receives packets and sequentially outputs them.

As illustrated in FIG. 3, it may be assumed that both the first and second input terminals MI0 and MI1 receive a first packet to be output to the first output terminal SI0, and then receive a second packet to be output to the second output terminal SI1. In queues connected to the first and second input terminals MI0 and MI1, head packets are all output to the first output terminal SI0. For this reason, one packet, here, the packet output from the first input terminal MI0, is transmitted, and the packet to be output from the second input terminal MI1 waits for the next turn. In this case, although there is a packet to be provided to the second output terminal SI1 in the queue of the first and second input terminals MI0/MI1, the packet cannot be output due to the previous packet. Here, only one channel among the output terminals SI0/SI1 is used, so only 50% is available.

For convenience of explanation, it may be assumed that combinations that may be stochastically made between the output terminals SI0/SI1 and the input terminals MI0/MI1 may be evenly distributed to appear. In this case, an expected bandwidth obtainable from the switch 30 is 75%. The reason why the expected bandwidth is not 100% is because the channel might not be used to full capacity due to the HoL as described above.

Figure 4:
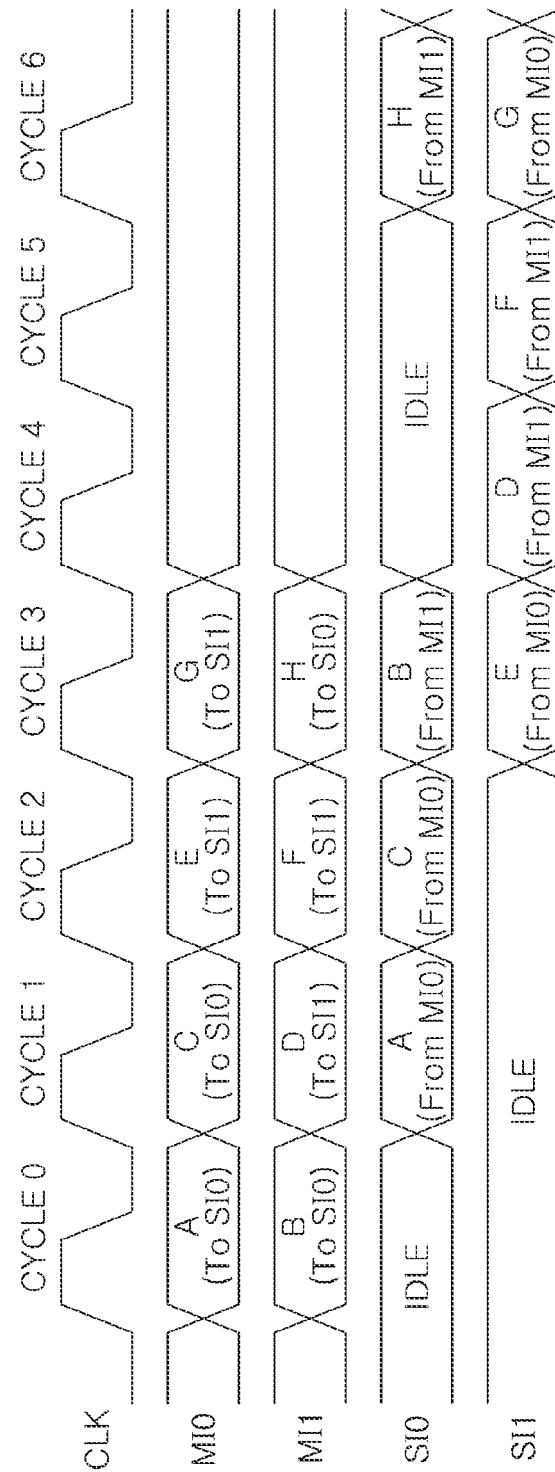
FIG. 4 is a timing diagram illustrating an operation timing of the switch 30 illustrated in FIG. 3.

FIG. 4 illustrates an operation timing of the switch 30 illustrated in FIG. 3. Referring to FIG. 4, a phenomenon that may arise in the switch 30 is expressed by waveforms. Data received from the first input terminal MI0 are A, C, E, G, respectively, and data received from the second input terminal MI1 are B, D, F, H, respectively, and in terms of a direction in which data is output, data output to the first output terminal SI0 are A, B, C, and H, and data output to the second output terminal SI1 are D, E, F, and G.

An arbiter at the output terminal of the switch 30 may perform arbitration based on priority. In FIG. 4, for convenience of explanation, it may be assumed that an arbiter at the first output terminal SI0 preferentially serves the first input terminal MI0, and an arbiter at the second output terminal SI1 preferentially serves the second input terminal MI1. In addition, since data which enters as an input is stored in a queue or buffer and then output, it may be assumed that there is a minimum delay time of 1 cycle between input and output. In this case, an operation timing is as follows.

During a first cycle (cycle 1), all data in a queue head of the first and second input terminals MI0/MI1, respectively, which were input in a preceding cycle (cycle 0), are directed towards the first output terminal SI0. In addition, since the first output terminal SI0 preferentially serves the first input terminal MI0, data A is transmitted to the output terminal SI0. There is no data transmitted to the second output terminal SI1 yet.

During a second cycle (cycle 2), data in the queue head of the first and second input terminals MI0/MI1, respectively, which were input in a preceding cycle (cycle 1), are directed towards the first output terminal SI0 and the second output terminal SI1, respectively. In addition, since the first output terminal SI0 preferentially serves the first input terminal MI0, data C is transmitted to the first output terminal SI0. There is no data transmitted to the second output terminal SI1 yet.

During a third cycle (cycle 3), all data in a queue head of the first and second input terminals MI0/MI1, respectively, which were input in a preceding cycle (cycle 2), are directed towards the second output terminal SI1. In addition, data B is transmitted to the first output terminal SI0, and data E is transmitted to the second output terminal SI1.

During a fourth cycle (cycle 4), the data in the queue head of the first input terminal MI0, which was input in a preceding cycle (cycle 3), is directed to the second output terminal SI1, and the data in the queue head of the second input terminal MI1, which was input in a preceding cycle (cycle 3), is directed to the first input terminal SI0. In addition, no data is transmitted to the first output terminal SI0, and since the second output terminal SI1 preferentially serves the second input terminal MI1, data D is transmitted to the second output terminal SI1.

During a fifth cycle (cycle 5), since the second output terminal SI1 preferentially serves the second input terminal MI1, data F is transmitted to the output terminal. There is no data output to the first output terminal SI0.

During a sixth cycle (cycle 6), data H is output to the first output terminal SI0 and data G is output to the second output terminal SI1.

A switch according to an embodiment of the present disclosure may be implemented to simultaneously output packets to the output terminal when the packets stored in the queue are directed in different directions, to obtain a bandwidth close to 100% by avoiding the HoL phenomenon described above.

Figure 5:
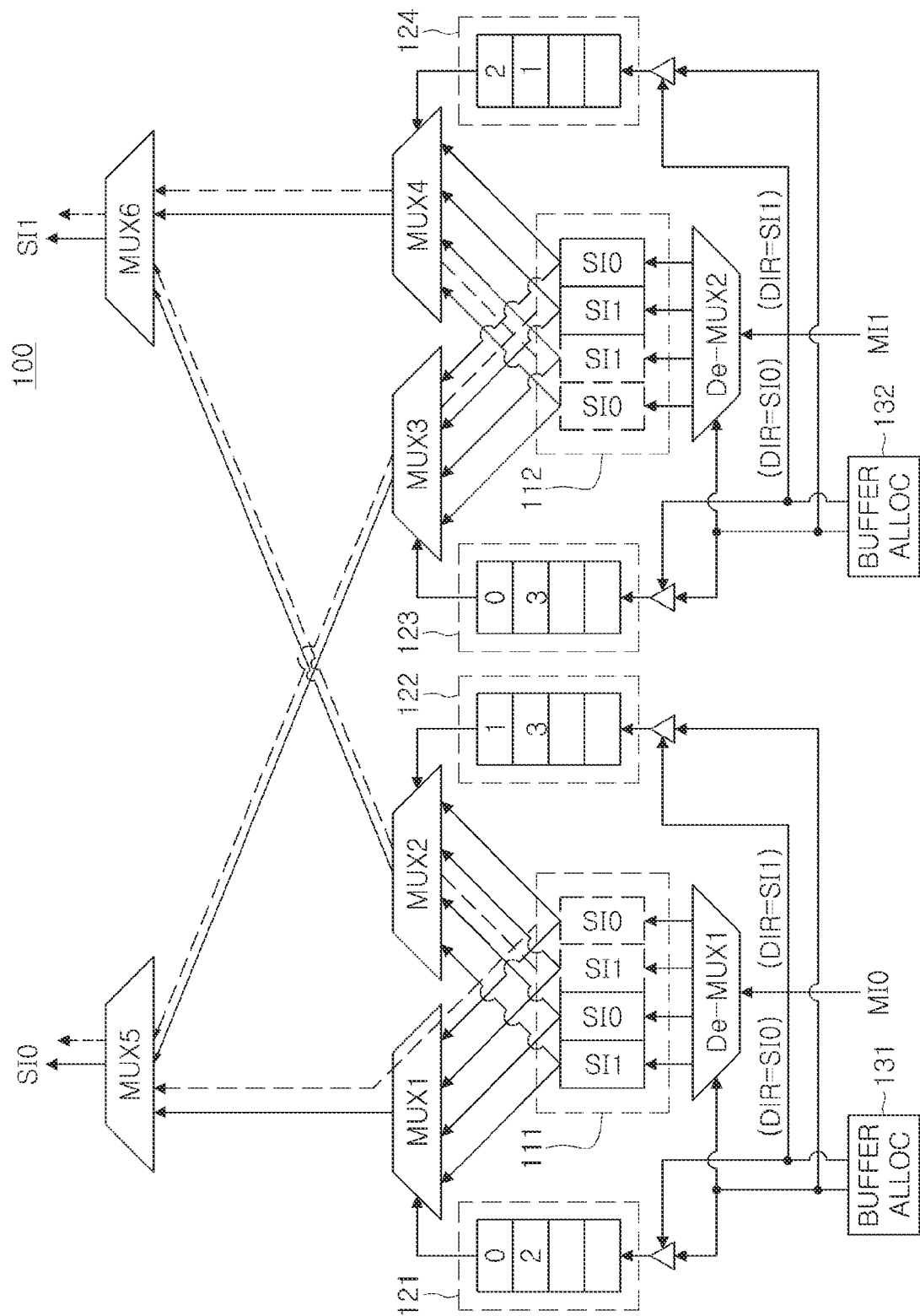
FIG. 5 is a block diagram illustrating a switch of a network-on-chip (NoC) according to an embodiment of the present disclosure.

FIG. 5 illustrates a switch 100 of a NoC according to an embodiment of the present disclosure. Referring to FIG. 5, the switch 100 may include first and second buffers 111 and 112, ordering queues 121, 122, 123, and 124, first and second buffer allocators 131 and 132, and multiplexers MUX1 to MUX6.

The first and second buffers 111 and 112 may be implemented to store packets from the de-multiplexers De-MUX1 and De-MUX2, respectively. The first buffer 111 may store first packets received from the first input terminal MI0. The second buffer 112 may store second packets received from the second input terminal MI1.

The first to fourth ordering queues 121, 122, 123, and 124 may each be implemented to sequentially store the order of packets for each output stage. For example, the first and second ordering queues 121 and 122 may sequentially store the order of packets of the first output terminal SI0. In addition, the third and fourth ordering queues 123 and 124 may sequentially store the order of packets of the second output terminal SI1.

The first ordering queue 121 may store first buffer locations (buffer numbers) of first internal packets directed to the first output terminal SI0, among the first packets. The second ordering queue 122 may store second buffer locations of second internal packets directed to the second output terminal SI1, among the first packets. The third ordering queue 123 may store third buffer locations of third internal packets directed to the first output terminal SI0, among the second packets. The fourth ordering queue 124 may store fourth buffer locations of fourth internal packets directed to the second output terminal SI1, among the second packets.

In an embodiment, when the buffer location and the output terminal information are determined, the packets may be stored in the buffer locations and locations thereof may be stored in the ordering queues of corresponding output terminals. Each of the ordering queues 121, 122, 123, and 124 may sequentially store locations in which packets are stored in the direction of each output terminal. This is to control the packets to sequentially exit without re-ordering according to directions of the output terminals.

The first and second buffer allocators 131 and 132 may be implemented to transfer packets received from the corresponding input terminals MI0 and MI1 to the buffers, determine the orders corresponding to the output terminals, and stores the determined orders in the ordering queues. The first buffer allocator 131 may allocate first buffer locations and second buffer locations for each of the first packets. The second buffer allocator 132 may allocate third buffer locations and fourth buffer locations for each of the second packets.

Each of the buffer allocators 131 and 132 may determine which buffer location the input packets are to enter. An algorithm for determining the buffer locations may be configured according to various methods. For example, a buffer locating algorithm may be configured to select one of the empty locations.

The output terminals from which the received packets are to exit may be determined according to routing information. A method of determining output terminals may be implemented in various ways. In an embodiment, the packets themselves may already have information on which output terminals they are to exit.

The multiplexers MUX1 to MUX6 may be implemented to configure an output circuit, arbitrate packets output from each input terminal, and transmit the packets to output channels.

In an embodiment, packets may be transmitted to the output terminals using buffer locations at the heads of the ordering queues in the direction of each output terminal. In particular, when packets to be provided to different directions are stored in the buffers, the packets may be simultaneously transmitted to the corresponding output terminals.

The operation of the switch 100 according to an embodiment of the present disclosure may be performed as follows. When a packet is received through the first input terminal MI0, the packet may be allocated to the buffer 111 by the buffer allocator 131. In addition, an output terminal (SI0 or SI1) may be selected using information included in the corresponding packet. Here, for convenience of explanation, it will be assumed that the first output terminal SI0 is selected. In this case, a buffer number allocated to the ordering queue 121 of the corresponding output terminal SI0 may be recorded. Packets stored in the buffer 111 may be read simultaneously for each output terminal. Therefore, the packets may be read using the buffer numbers sequentially stored in the ordering queue for each output terminal. The output terminal may arbitrate a packet coming from each input terminal and transmit the packet to an output channel, similar to the structure of the switch 30 (see FIG. 3).

The switch 100 according to an embodiment of the present disclosure may simultaneously transmit packets to each output terminal by changing a structure of the input terminal in the existing switch 30. As a result, packet processing capability of the switch may be increased by eliminating a conflict caused by a head-of-line (HoL) blocking phenomenon. For example, when a 2×4 switch is configured based on the NoC of the present disclosure, a bandwidth increase of up to 10.3% may be achieved. This bandwidth increase may, in turn, increase performance of bandwidth-driven applications such as NPU and GPU. In addition, as a size of a switch increases according to an increase in the number of masters and an increase in the number of DRAM memory channels, collisions occurring in existing switches increase, and thus, the effect of increasing the bandwidth may be further scaled or multiplied.

The switch 100 illustrated in FIG. 5 is a 2×4 switch, but it should be appreciated that the present disclosure is not limited thereto. For example, the switch may be a 3×9 switch, a 4×16 switch, or the like.

Figure 6:
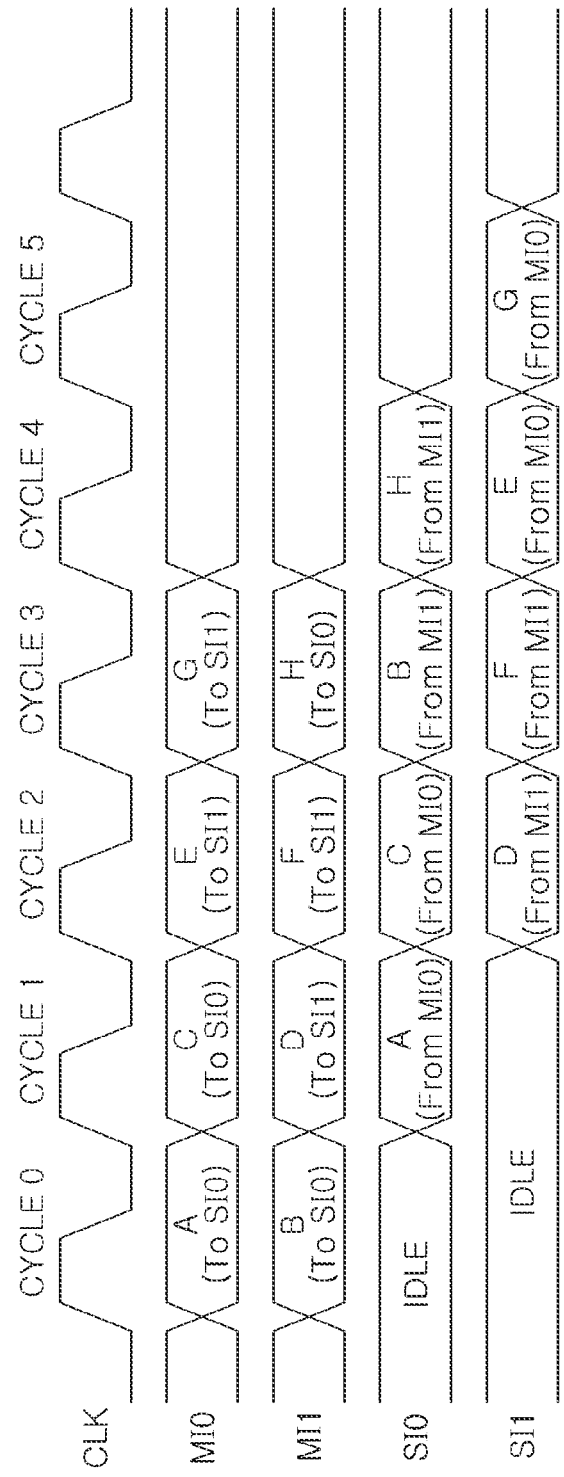
FIG. 6 is a timing diagram illustrating an operation timing of a switch according to an embodiment of the present disclosure.

FIG. 6 illustrates an operation timing of the switch 100 according to an embodiment of the present disclosure. Referring to FIG. 6, the extent to which a bandwidth of the switch 100 is increased is expressed by waveforms. Since data which enters the input terminal is stored in the buffer and then output, it may be assumed that there is a delay time of one cycle. In this case, an operation timing is as follows.

During a first cycle (cycle 1), data in the buffers 111 and 112 of the first and second input terminals MI0/MI1, respectively, which were input in a preceding cycle (cycle 0), are all directed to the first output terminal SI0. Since the first input terminal SI0 preferentially serves the first input terminal MI0, data A may be transferred to the output terminal SI0. There is no data output to the second output terminal SI1.

During a second cycle (cycle 2), data in the first buffer 111 of the first input terminal MI0 is directed to the first output terminal SI0. Data in the second buffer 112 of the second input terminal MI1 is directed to the first output terminal SI0 and the second output terminal SI1. Since the first output terminal SI0 preferentially serves the first input terminal MI0, data C may be transferred to the output terminal SI0. Since data, in the second buffer 112 of the second input terminal MI1, to be provided to the second output terminal SI1, may also be transmitted to the output terminal SI1, the data D may be transferred to the output terminal SI1.

During a third cycle (cycle 3), data in the first buffer 111 of the first input terminal MI0 is directed to the second output terminal SI1. Data in the second buffer 112 of the second input terminal MI1 is directed to the first output terminal SI0 and the second output terminal SI1. Since the data directed to the first output terminal SI0 is only in the second buffer 112 of the second input terminal MI1, the corresponding data B may be transferred to the output terminal SI0. Data directed to the second output terminal SI1 exists in both the first and second input terminals MI0/MI1; however, the arbiter of the second output terminal SI1 gives priority to the second input terminal MI1, so data F may be transferred to the output terminal SI1.

During a fourth cycle (cycle 4), data in the first buffer 111 of the first input terminal MI0 is directed to the second output terminal SI1 and data in the second buffer 112 of the second input terminal MI1 is directed to the first output terminal SI0. Accordingly, data H and data E may be transferred to the first and second output terminals SI0 and SI1, respectively.

During a fifth cycle (cycle 5), since only the first buffer 111 of the first input terminal MI0 has data to be provided to the second output terminal SI1, data G may be transferred to the second output terminal SI1.

Compared with the timing shown in FIG. 4, the switch 100 according to an embodiment of the present disclosure takes fewer cycles for transmitting 8 pieces of data. Since there is no IDLE section in the middle, the maximum bandwidth may be achieved.

Figure 7:
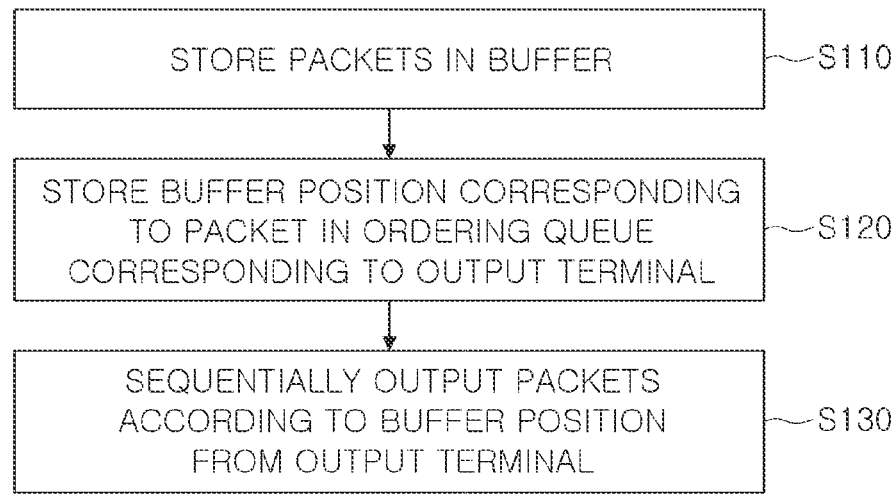
FIG. 7 is a flowchart diagram illustrating an operation method of a NoC according to an embodiment of the present disclosure.

FIG. 7 is a flowchart illustrating a method of operating a NoC according to an embodiment of the present disclosure. Referring to FIGS. 5 to 7, the operation of the NoC according to an embodiment of the present disclosure may be performed as follows.

The buffer allocator may recognize a location of a buffer for each of the packets received according to an associated input terminal and/or output terminal. The buffer allocator may store the received packets in a buffer location corresponding to each of the received packets (S110). In addition, the buffer allocator may store the buffer location in an ordering queue corresponding to an output terminal for outputting a packet (S120). The output terminal may sequentially output the packets received from the buffer according to the location of the buffer stored in the ordering queue (S130).

In an embodiment, packets may be received from an input terminal, and an output terminal may be determined using routing information for each of the received packets. In an embodiment, a buffer location in which each packet is to be stored may be allocated. In an embodiment, packets are stored in a buffer, and a cycle may be delayed until any one of the packets stored in the output terminal is output. In an embodiment, the output terminal may receive a packet from a buffer corresponding to the input terminal and at the same time receive another packet from a buffer corresponding to another input terminal different from the input terminal.

Figure 8:
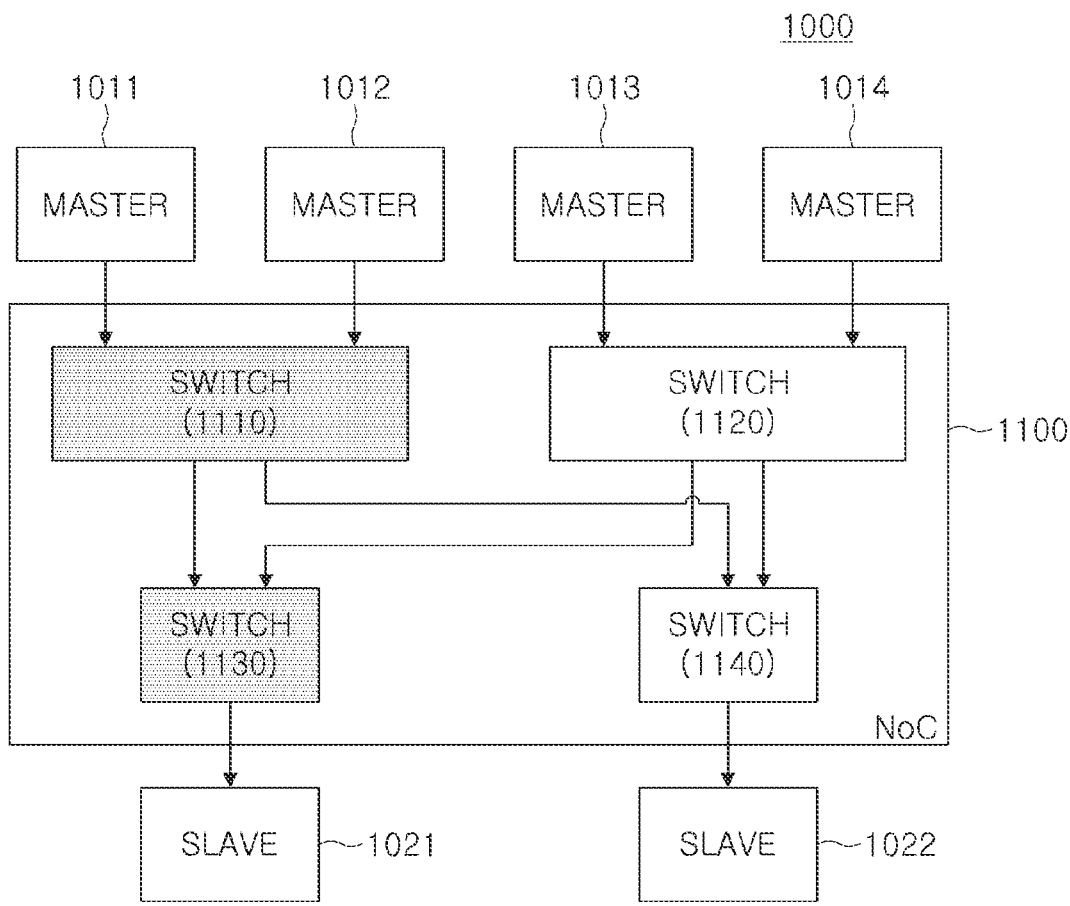
FIG. 8 is a block diagram illustrating a SoC 1000 according to an embodiment of the present disclosure.

FIG. 8 illustrates an SoC 1000 according to an embodiment of the present disclosure. Referring to FIG. 8, the SoC 1000 may include a plurality of masters 1011, 1012, 1013, and 1014, a plurality of slaves 1021 and 1022, and a NoC 1100.

Each of the plurality of masters 1011, 1012, 1013, and 1014 may be hardware such as a CPU, GPU, or DMA that accesses a slave to request the slave to start a read and write operation.

Each of the plurality of slaves 1021 and 1022 may be hardware that actually performs the read/write operation according to the request from the master, and transmits a corresponding result back to the master. Each of the plurality of slaves 1021 and 1022 may include a DRAM memory controller, a configuration register, or the like.

The master and the slave may each be connected to the NoC 1100 to perform communication with each other. Embodiments are not limited thereto.

The NoC 1100 may be implemented to deliver a message transmitted by the masters 1011, 1012, 1013, and 1014 and/or the slaves 1021 and 1022 through a switch. The NoC 1100 may include four switches 1110, 1120, 1130, and 1140, without limitation thereto. Here, each of the switches 1110, 1120, 1130, and 1140 may be implemented similarly to the switch 100 described in FIGS. 5 to 7. Substantially duplicate description may be omitted.

The NoC 1100 shown in FIG. 8 is implemented in a 4×2 cross structure, but NoC embodiments of the present disclosure are not limited thereto. It should be understood that the number of input/output ports of each switch and the number of masters and slaves shown in FIG. 8 are not limited by the illustrative example.

In addition, an NoC according to an embodiment of the present disclosure may be implemented as a memory interleaving device. The memory interleaving device may include a plurality of slave terminals connected to masters, a plurality of master terminals connected to the slaves, and a crossbar switch connected between the slave terminals and the master terminals. Here, the crossbar switch may be implemented like the switch described in FIGS. 5 to 6 and a packet transmission method thereof, without limitation thereto.

Figure 9:
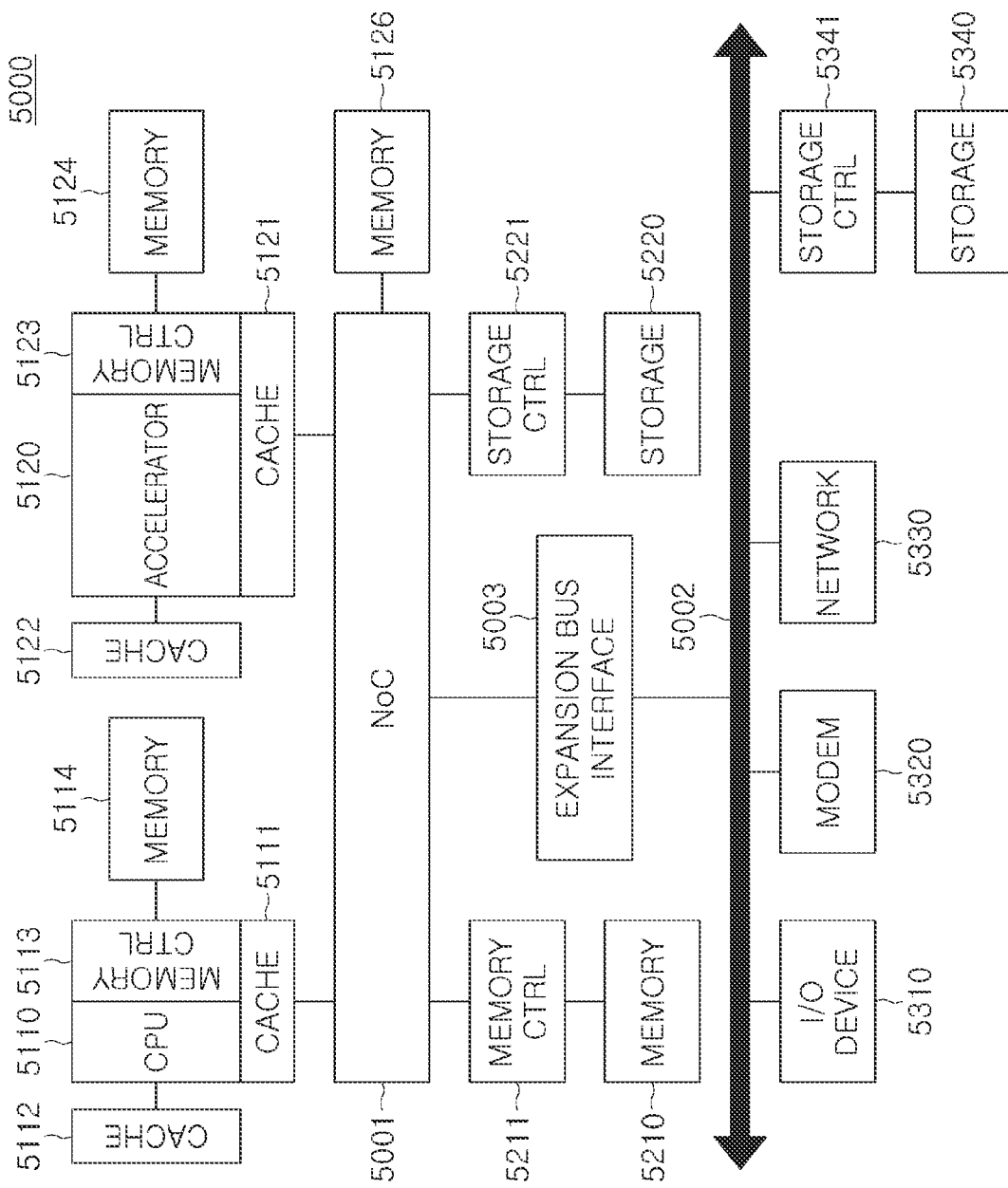
FIG. 9 is a block diagram illustrating a computing system 5000 according to an embodiment of the present disclosure.

FIG. 9 illustrates a computing system 5000 according to an embodiment of the present disclosure. Referring to FIG. 9, the computing system 5000 may include a central processing unit (CPU) 5110, an accelerator 5120, memories 5114, 5124, and 5126, a memory device 5210 and/or a storage device 5220.

The computing system 5000 may further include an expansion bus 5002, and at least one of an input/output (I/O) device 5310, a modem 5320, a network device 5330, and/or a storage device 5340 connected to the expansion bus 5002.

The accelerator 5120 may include a graphical processing unit (GPU), a neural processing unit (NPU), or an application-specific processing unit. The expansion bus 5002 may be connected to a NoC 5001 through an expansion bus interface 5003.

In an embodiment, each of the CPU 5110 and the accelerator 5120 may include on-chip caches 5111 and 5121, respectively. In an embodiment, the CPU 5110 may include an off-chip cache 5112. The accelerator 5120 may include an off-chip cache 5122. In an embodiment, the off-chip cache 5112 or 5122 may be internally connected to the CPU 5110 and/or the accelerator 5120, respectively, through different buses.

In an embodiment, the on-chip and/or off-chip cache or caches may each include a volatile memory such as a dynamic random-access memory (DRAM) or a static random-access memory (SRAM); and/or a nonvolatile memory such as a NAND flash memory, a phase-change random-access memory (PRAM), or a resistive random-access memory (RRAM).

In an embodiment, the memories 5114 and 5124 may be connected to the CPU 5110 and/or the accelerator 5120 through corresponding memory controllers 5113 and 5123, respectively. In an embodiment, the memory 5126 may be connected to the CPU 5110 and the accelerator 5120 through the NoC 5001. Here, the NoC 5001 may include memory controllers controlling the corresponding memory 5126.

In an embodiment, each NoC 5001 may be implemented as a wired network device, a wireless network device, a switch, a bus, a cloud, and/or an optical channel, without limitation thereto. In an embodiment, each NoC 5001 may include a network-on-chip such as described in FIGS. 5 to 8.

In an embodiment, the memory 5126 may include a GPU memory. The GPU memory may maintain instructions and data that may interact with the GPU. Instructions and data may be copied to the GPU memory, for example, from a main memory or storage. The GPU memory may store image data and may have a larger bandwidth than the main memory or storage, without limitation thereto. The GPU memory may separate a clock from a CPU. The GPU may read image data from GPU memory, and process the read image data, and then write the processed data to the GPU memory. The GPU memory may be configured to accelerate graphics processing.

In an embodiment, the memory 5126 may include an NPU memory. The NPU memory may maintain instructions and data that may interact with the NPU. The instructions and data may be copied to the NPU memory, for example, from the main memory or storage. The NPU memory may maintain weight data for neural networks. The NPU memory may have a wider bandwidth than the main memory or storage, without limitation thereto. The NPU memory may separate a clock from the CPU. The NPU may read weight data from the NPU memory, perform updating, and then write the updated data to the NPU memory during training. The NPU memory may be configured to accelerate machine learning such as neural network training and inference.

In an embodiment, the main memory may include a volatile memory such as DRAM and/or SRAM, and/or a nonvolatile memory such as NAND flash memory, PRAM, and/or RRAM. The main memory may have lower latency and/or lower capacity than those of memory 5210 and/or storage 5220.

The CPU 5110 and the accelerator 5120 may access the memory 5210 and/or storage 5220 through the NoC 5001. The memory device 5210 may be controlled by the memory controller 5211. Here, the memory controller 5211 may be connected to the NoC 5001. The storage device 5220 may be controlled by a storage controller 5221. Here, the storage controller 5221 may be connected to the NoC 5001.

The storage device 5220 may be implemented to store data. The storage controller 5221 may be implemented to read data from the storage device 5220 and transmit the read data to a host. The storage controller 5221 may be implemented to store, in the storage device 5220, data transmitted in response to a request from the host. Each of the storage device 5220 and the storage controller 5221 may include a buffer for storing metadata, reading a cache to store frequently accessed data, or storing a cache to increase write efficiency. For example, the write cache may receive and process a number of write requests.

A switch structure of the present disclosure includes an input terminal and an output terminal. The input terminal includes a buffer that stores input packets, an ordering queue that sequentially records an order of packets for each output terminal, and a buffer allocator. The output terminal includes a device that arbitrates packets from each input terminal and delivers the packets to an output channel. When a packet enters the input terminal, the packet is allocated to the buffer by the buffer allocator. An output terminal is selected using information included in the corresponding packet, and a buffer number allocated to the ordering queue of the corresponding output terminal is recorded. Packets stored in the buffer or buffers may be read substantially simultaneously at substantially the same time for each output terminal. Accordingly, packets may be read using the buffer numbers sequentially stored in the ordering queue for each output terminal. The output terminal arbitrates packets coming from each input terminal and delivers the packets to the output channel, similar to the switch structure.

In the present disclosure, packets can be substantially simultaneously transferred to each output terminal by changing the structure of the input terminal to resolve a conflict due to a head-of-line (HoL) blocking phenomenon, thereby increasing packet processing capabilities of the switch.

Applicable systems may become increasingly larger and require higher memory bandwidth. Thus, the current 4-channel memory interface may be increased to an 8-channel or 16-channel memory interface, or the like. Such an increase in the number of channels further increases an HoL probability within the NoC, and thus, a phenomenon in which the bandwidth does not increase in proportion to the number of channels might otherwise occur. In order to address this phenomenon, a technique is disclosed and applied that is capable of reducing the HoL probability within the NoC and increasing the bandwidth in proportion to the channel.

The present disclosure may be applied to an on-chip network connecting sub-components within an IP design. For example, the present disclosure may be applied to an on-chip network connecting hardware constituting a deep learning neural network. In particular, in IP that requires a high on-chip communication bandwidth, performance may be increased by increasing the bandwidth through this technology.

The present disclosure may be applied to cache coherent Interconnect. In cache coherent interconnect, various messages such as snoop communicate between coherent masters, and in this case, high-performance on-chip communication may be required for performance and scalability. The present disclosure may be applied to satisfy these performance requirements.

The switch for transmitting a packet a network-on-chip (NoC) having the same, and an operating method thereof according to an embodiment of the present disclosure allow packets to be simultaneously transferred to output terminals, respectively, through a change in structure of an input terminal, thereby solving a packet collision due to a head-of-line blocking phenomenon and increasing packet processing capability of the switch.

While embodiments have been shown and described above by means of example, it will be apparent to those of ordinary skill in the pertinent art that modifications and variations may be made without departing from the scope of the present disclosure as defined by the appended claims.

What is claimed is:

1. A method of operating a network on a chip, comprising:
   receiving a first packet with a first output interface direction through a first master interface terminal in response to a clock signal;
   receiving a second packet with a second output interface direction through a second master interface terminal in response to the clock signal;
   storing the first packet and the second packet with corresponding buffer index queues in a buffer memory;
   sequentially outputting at least one of the stored packets through a first slave interface terminal based on the buffer index queues in response to the clock signal when at least one of the first output interface direction or the second output interface direction indicates the first slave interface terminal; and
   sequentially outputting at least one of the stored packets through a second slave interface terminal based on the buffer index queues in response to the clock signal when at least one of the first output interface direction or the second output interface direction indicates the second slave interface terminal.

2. The method of claim 1, wherein the first packet and the second packet are received simultaneously within one cycle of the clock signal.

3. The method of clam 1, wherein one of the first slave interface terminal or the second interface terminal outputs one packet one cycle of the clock signal earlier than the other packet.

4. The method of claim 3, wherein the packet output from the one slave interface terminal is output in a next cycle of the clock signal after receiving both the first and the second packets.

5. The method of claim 4, wherein the other slave interface terminal maintains an idle state until the next cycle.

6. The method of claim 4, wherein the one slave interface terminal sequentially outputs packets in cycles of the clock signal without maintaining an idle state.

7. The method of claim 1, wherein the first and second packets received from the first master interface terminal and the second master interface terminal in one cycle of the clock signal are output through the first slave interface terminal and the second slave interface terminal in different cycles of the clock signal.

8. The method of claim 1,
   wherein the first master interface terminal sequentially receives A-packet, C-packet, E-packet and G-packet,
   wherein the second master interface terminal sequentially receives B-packet, D-packet, F-packet and H-packet.

9. The method of claim 8,
   wherein the first slave interface terminal sequentially outputs the A-packet, the C-packet, the B-packet and the H-packet,
   wherein the second slave interface terminal sequentially outputs the D-packet, the F-packet, the E-packet and the G-packet.

10. The method of claim 9,
    wherein the first slave interface terminal outputs the A-packet when the first master interface terminal receives the C-packet,
    wherein the second slave interface terminal outputs the D-packet when the second master interface terminal receives the F-packet.

11. A method of operating a Network-on-Chip (NoC), comprising:
    receiving first consecutive packets in a first master interface terminal starting from a first cycle of a clock signal;
    receiving second consecutive packets in a second master interface terminal starting from the first cycle;
    outputting third consecutive packets from a first slave interface terminal starting from a next cycle following the first cycle; and
    outputting fourth consecutive packets from a second slave interface terminal starting from a cycle following the next cycle.

12. The method of claim 11, further comprising storing the first consecutive packets and the second consecutive packets with corresponding buffer index queues in a buffer memory.

13. The method of claim 11, wherein each of the received consecutive packets includes an output interface direction.

14. The method of claim 13, further comprising allocating the first slave interface terminal and the second slave interface terminal according to the buffer index queues and the output interface direction for outputting packets.

15. The method of claim 11, wherein the NoC is configured with a 2×4 switch.

16. A system on a chip comprising:
    a plurality of master devices;
    a plurality of slave devices; and
    a network-on-chip configured to arbitrate packets between the plurality of master devices and the plurality of slave devices,
    wherein the network-on-chip receives first consecutive packets in a first master interface terminal starting from a first cycle of a clock signal; receives second consecutive packets in a second master interface terminal starting from the first cycle; outputs third consecutive packets from a first slave interface terminal starting from a next cycle following the first cycle; and outputs fourth consecutive packets from a second slave interface terminal starting from a cycle following the next cycle.

17. The system on a chip of claim 16, wherein the network-on-chip further comprises a buffer memory configured to store the first consecutive packets and the second consecutive packets with corresponding buffer index queues.

18. The system on a chip of claim 16, wherein each of the received consecutive packets includes an output interface direction.

19. The system on a chip of claim 18, wherein the network-on-chip allocates the first slave interface terminal and the second slave interface terminal according to the buffer index queues and the output interface direction for outputting packets.

20. The system on a chip of claim 16, wherein the network-on-chip comprises:
- a first buffer configured to store first packets received from the first master interface terminal;
- a second buffer configured to store second packets received from the second master interface terminal;
- a first ordering queue configured to store first buffer locations of first internal packets to be provided to the first slave interface terminal from among the first packets;
- a second ordering queue configured to store second buffer locations of second internal packets to be provided to the second slave interface terminal from among the first packets;
- a third ordering queue configured to store third buffer locations of third internal packets to be provided to the first slave interface terminal from among the second packets;
- a fourth ordering queue configured to store fourth buffer locations of fourth internal packets to be provided to the second slave interface terminal from among the second packets;
- a first buffer allocator configured to allocate the first buffer locations and the second buffer locations for each of the first packets; and
- a second buffer allocator configured to allocate the third buffer locations and the fourth buffer locations for each of the second packets.

* * * * *